United States Patent
Kellner et al.

(10) Patent No.: US 10,399,608 B2
(45) Date of Patent: Sep. 3, 2019

(54) INTEGRAL COMPONENT OF A MOTOR VEHICLE FRAME

(71) Applicant: Dr. Ing. h. c. F. Porsche AG, Stuttgart (DE)

(72) Inventors: Philipp Kellner, Weil der Stadt (DE); Ralph Renz, Sindelfingen (DE); Frank Haeusler, Zerbst/Anhalt (DE); Sophie Kerchnawe, Leipzig (DE); Olaf Taeger, Braunschweig (DE)

(73) Assignee: DR. ING. H. C. F. PORSCHE AG, Stuttgart (DE)

( * ) Notice: Subject to any disclaimer, the term of this patent is extended or adjusted under 35 U.S.C. 154(b) by 18 days.

(21) Appl. No.: 15/808,912

(22) Filed: Nov. 10, 2017

(65) Prior Publication Data

US 2018/0141592 A1 May 24, 2018

(30) Foreign Application Priority Data

Nov. 18, 2016 (DE) .................. 10 2016 222 717

(51) Int. Cl.
*B62D 29/00* (2006.01)
*B62D 27/02* (2006.01)

(52) U.S. Cl.
CPC .......... *B62D 29/001* (2013.01); *B62D 27/02* (2013.01); *B62D 29/005* (2013.01)

(58) Field of Classification Search
CPC ..... B62D 29/005; B62D 27/02; B62D 29/001

USPC .................................................... 296/193.07
See application file for complete search history.

(56) References Cited

U.S. PATENT DOCUMENTS

| | | | |
|---|---|---|---|
| 9,868,475 B2* | 1/2018 | Miyamoto | B62D 27/02 |
| 2008/0116701 A1* | 5/2008 | Boumaza | B29C 45/14311 293/120 |
| 2011/0254311 A1* | 10/2011 | Dajek | B29C 45/1671 296/146.6 |
| 2012/0015553 A1* | 1/2012 | Rosendahl | H01R 13/506 439/535 |
| 2014/0145469 A1* | 5/2014 | Mildner | B62D 29/005 296/193.06 |
| 2016/0311472 A1* | 10/2016 | Lanard | B62D 25/084 |
| 2017/0166261 A1* | 6/2017 | Memili | B29C 66/7392 |
| 2017/0225720 A1* | 8/2017 | Sanders | B21C 37/00 |

FOREIGN PATENT DOCUMENTS

| | | |
|---|---|---|
| DE | 102011004249 A1 | 8/2012 |
| DE | 102012213663 A1 | 2/2014 |

\* cited by examiner

*Primary Examiner* — Pinel E Romain
(74) *Attorney, Agent, or Firm* — Leydig, Voit & Mayer, Ltd.

(57) ABSTRACT

An integral component of a vehicle body includes an open profiled element and a reinforcing rib structure disposed in an interior of the open profiled element. The open profiled element has a fiber-plastics composite body having a first structure, and at least one reinforcement panel from metal for the localized reinforcement of the profiled element. The reinforcing rib structure is produced from a fiber-plastics composite having a second structure.

14 Claims, 1 Drawing Sheet

INTEGRAL COMPONENT OF A MOTOR VEHICLE FRAME

CROSS REFERENCE TO RELATED APPLICATIONS

This application claims benefit to German Patent Application No. DE 10 2016 222 717.3, filed on Nov. 18, 2016, which is hereby incorporated by reference herein.

FIELD

The invention relates to an integral component of a motor vehicle frame.

BACKGROUND

In the modern-day development of motor vehicles, the development engineers strive to design as lightweight a motor vehicle as possible and, on account thereof, to reduce fuel consumption and environmental stress and to improve the handling of the vehicle on the road. The lightweight construction mode herein is implemented in that materials that have been traditionally used are replaced by newly developed materials of low density, for example. Components of the motor vehicle frame which in earlier days were produced from steel or aluminum are thus produced from fiber-plastics composites or from hybrid materials composed of a metal and of a fiber-plastics composite, for example. In comparison to aluminum and in particular to steel, the fiber-plastics composites are of a lower density, the weight being reduced on account thereof.

The mechanical properties of fiber-plastics composites differ from the mechanical properties of steel or aluminum such that the components from fiber-plastics composites have to be reinforced by rib structures and by insert parts. For example, DE 10 2012 213 663 A1 discloses a transmission support which is embodied from a profiled element and a rib structure. The profiled element and the rib structure are embodied so as to be integral and are produced from a single fiber-plastics composite.

It is disadvantageous in the embodiment described in DE 10 2012 213 663 A1 that the profiled element is embodied so as to be integral to the rib structure and on account thereof, depending on the choice of the fiber-plastics composite, either the integral component is weak in terms of rigidity and strength, or the production costs of the integral component are very high, since the entire integral component is produced from a highly stress-resistant fiber-plastics composite.

SUMMARY

In an embodiment, the present invention provides an integral component of a vehicle body. The integral component includes an open profiled element and a reinforcing rib structure disposed in an interior of the open profiled element. The open profiled element has a fiber-plastics composite body having a first structure, and at least one reinforcement panel from metal for the localized reinforcement of the profiled element. The reinforcing rib structure is produced from a fiber-plastics composite having a second structure.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
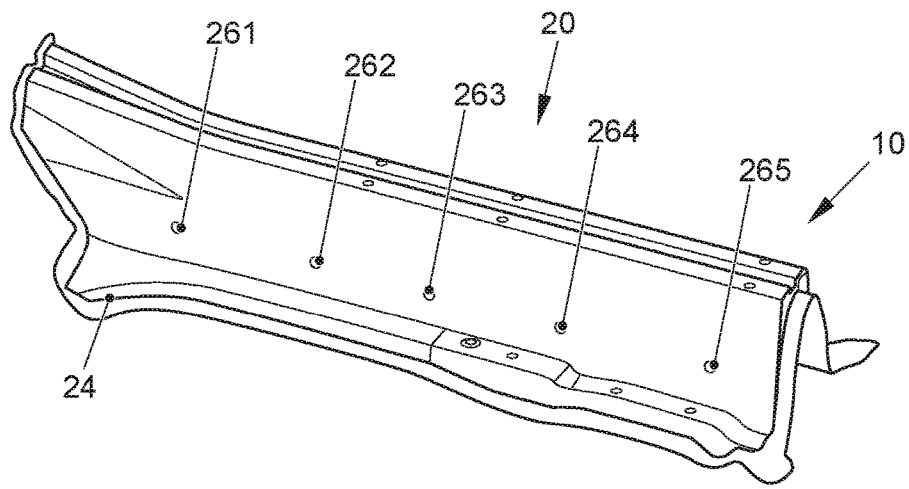
FIG. 1 shows a perspective illustration of an integral component.

Embodiments of the invention provide an integral component of a motor vehicle frame in such a manner that the integral component is producible in a cost-effective manner and is of high rigidity and strength.

An integral component according to an embodiment of the invention has an open profiled element having a reinforcing rib structure. The open profiled element can be embodied in an elongated manner so as to have a U-shaped cross section, for example, wherein the rib structure that reinforces the profiled element is disposed between the two legs of the U-shaped profiled element.

The profiled element has a U-shaped fiber-plastics composite body having a first structure, and at least one reinforcement panel from metal, wherein the reinforcement panel serves for the localized reinforcement of the profiled element. The profiled element can have a plurality of reinforcement panels which in this way mechanically reinforce a plurality of highly stressed regions of the profiled element.

The rib structure that is disposed in the interior of the open profiled element is produced from a fiber-plastics composite having a second structure, wherein the second structure of the fiber-plastics composite differs from the first structure of the fiber-plastics composite body. The structure of a fiber-plastics composite is defined largely by the type of the plastics matrix material, usually composed of a thermoplastic or a thermoset material, by the fiber material, and by the fiber length. On account of the embodiment of the fiber-plastics composite body from a fiber-plastics composite having a first structure, and on account of the insertion of reinforcement panels and of the embodiment of the rib structure from a fiber-plastics composite having a second structure, the integral component is of high strength and rigidity and is producible in a cost-effective manner.

In one or more embodiments, the fiber-plastics composite body is produced from a thermoplastic matrix having endless fibers embedded in the latter. As opposed to a matrix that is produced from a thermoset material, the thermoplastic matrix can be re-fused, on account of which the effort in terms of production time is reduced and the production of complex components is simplified. The fiber length inter alia is decisive in terms of the mechanical properties of a fiber-plastics composite. Usually, short, long, or endless fibers are thus embedded in the matrix, wherein a fiber-plastics composite having embedded endless fibers has a particularly high rigidity.

The fiber-plastics composite having a second structure preferably comprises a thermoplastic matrix and short and/or long fibers embedded in the latter. The fiber-plastics composites having short and/or long fibers can be produced in a cost-effective and simple manner. Moreover, fiber-plastics composites having short and/or long fibers can be embodied in such a manner that the fiber-plastics composite has an almost isotropic behavior.

In one or more embodiments, an encircling peripheral region of the fiber-plastics composite body is bordered by the fiber-plastics composite having the second structure, wherein the peripheral region is an encircling terminating edge of the fiber-plastics composite body. In this way, the fiber-plastics composite body if at all has to be post-machined to only a minor extent, on account of which the production costs of the profiled element, or of the integral element, respectively, are reduced.

The endless fibers that are embedded in the thermoplastic matrix are preferably carbon fibers, glass fibers, basalt fibers, and/or aramid fibers. Depending on the stress loads acting on the integral component, corresponding fiber materials can be employed herein, wherein carbon fibers have the highest strength, the integral component on account thereof being able to absorb high stress loads.

In one or more embodiments, the endless fibers are embedded as a woven fabric or as a cross-laid structure in the thermoplastic matrix, on account of which a high strength and rigidity of the fiber-plastics composite is achieved.

The fiber-plastics composite body and the rib structure are preferably interconnected in a materially integral manner. The fiber-plastics composite body herein, preferably in a combined manufacturing process, is initially produced, and the rib structure is subsequently injected. The production costs are reduced in this way, since the fiber-plastics composite body and the rib structure do not have to be interconnected by way of a separate assembly step.

The reinforcement panel is preferably disposed between the fiber-plastics composite body and the rib structure, wherein the reinforcement panel from metal in one preferred design embodiment has a form-fitting connection to the fiber-plastics composite body and/or to the rib structure. For example, the reinforcement panel from metal has holes by way of which the reinforcement panel is connected to the fiber-plastics composite body and/or to the rib structure in a form-fitting manner. In the production process of the integral component, the fiber-plastics composite body is initially formed, the reinforcement panel is inserted, and the rib structure is injected in the last step. Alternatively, the reinforcement panel is initially inserted, the fiber-plastics composite body is formed thereafter, and the rib structure is injected in the last step. The liquid fiber-plastics composite injected flows into or through, respectively, the holes that are configured in the reinforcement panel, on account of which in the cured state of the injected fiber-plastics composite a materially integral connection is created between the fiber-plastics composite body and the rib structure, and a form-fitting connection is created between the reinforcement panel from metal and the fiber-plastics composite body and/or the rib structure.

The reinforcement panel from metal preferably adheres to the fiber-plastics composite body and/or to the rib structure by way of an adhesion promoter. On account thereof the reinforcement panel is fastened to the fiber-plastics composite body and/or to the rib structure.

In one or more embodiments, the reinforcement panel is connectable to a metallic vehicle element that is adjacent to the profiled element, wherein the reinforcement panel is disposed on an axial end of the profiled element. Connecting components from fiber-plastics composites to metallic components requires particular precautionary measures, since in particular carbon fibers that are embedded in the matrix can cause crevice corrosion on the metallic components. The integral component, on account of the connection of the reinforcement panel to an adjacent metallic vehicle element, is connected to the adjacent metallic vehicle element in such a manner that crevice corrosion is avoided and that the effort for connecting the integral component to the adjacent metallic vehicle element is reduced.

The reinforcement panel can be produced from stainless steel, on account of which corrosion of the reinforcement panel is avoided.

In one or more embodiments, metallic non-reinforcing inserts are fixedly integrated in the profiled element and/or in the rib structure. The inserts are mechanical linking points in the form of threaded bores or threaded bolts, for example. The screw-fitting of adjacent components to the integral component is simplified on account of the inserts in that the screw-fitting points are defined and reinforced.

The integral component is preferably a transmission tunnel of a motor vehicle body, wherein the transmission tunnel contributes toward the flexural and torsional rigidity of the motor vehicle body and in the event of a front-end or rear-end collision, respectively, conjointly with the lateral longitudinal chassis beams of the body serves as the major longitudinal stress absorber.

Figure 2:
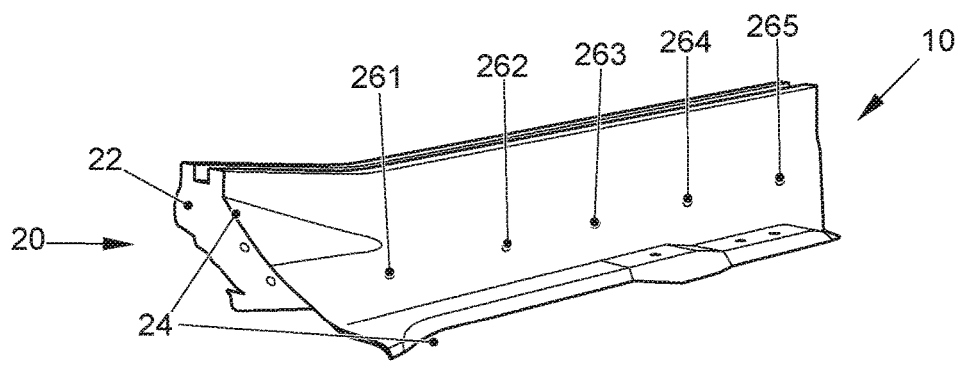
FIG. 2 shows an exploded illustration of the integral component of FIG. 1.
Figure 2:
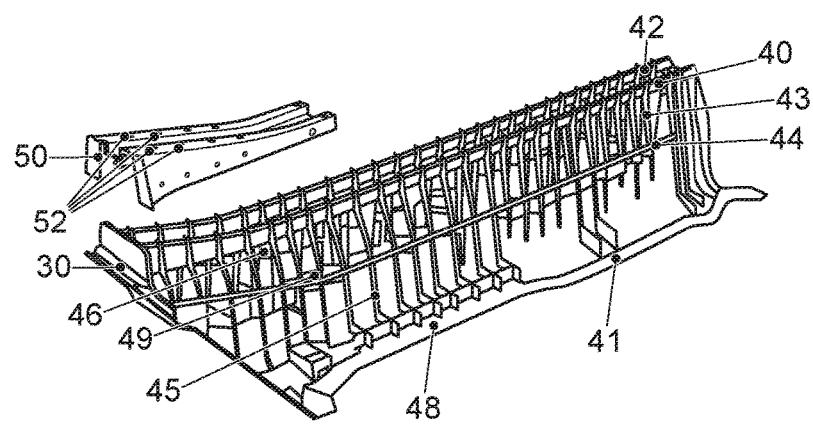

FIG. 1 shows a perspective illustration, and FIG. 2 shows an exploded illustration, of an integral component 10 of a motor vehicle frame. The integral component 10 is embodied as a transmission tunnel which together with the lateral sills increases the flexural and torsional rigidity and also forms the major longitudinal stress absorber of the safety cell in the event of a front-end or rear-end crash. Other exemplary embodiments of the integral component 10 are a lateral sill or a B-pillar of the motor vehicle body, for example.

The integral component 10 has an open profiled element 20 and a rib structure 30. The profiled element 20 has a U-shaped fiber-plastics composite body 22 having a first structure, wherein the structure of a fiber-plastics composite is defined by the fiber material, the matrix material, the fiber length, and the fiber orientation. The fiber-plastics composite body 22 thus has a thermoplastic matrix in which carbon fibers are embedded. The carbon fibers are embodied as endless fibers and are embedded as a woven fabric or a cross-laid structure in the thermoplastic matrix. The fibers in this exemplary embodiment are oriented in such a manner that the stress loads in the event of a front-end or rear-end crash, respectively, can be absorbed by the profiled element.

The rib structure 30 which is produced from a fiber-plastics composite 41, which has a second structure, and reinforces the fiber-plastics composite body 22 is disposed in the interior of the fiber-plastics composite body 22. The fiber-plastics composite 41 of the rib structure 30 herein is injection-molded onto the peripheral region of the fiber-plastics composite body 22 in such a manner that said fiber-plastics composite 41 borders the encircling peripheral region 24 of the fiber-plastics composite body 22. The rib structure 30 has two upper longitudinal supports 40, 42, two intermediate longitudinal supports 44, 46, and two lower longitudinal supports 48, 49. The upper longitudinal supports 40, 42 and the intermediate longitudinal supports 44, 46 are connected by way of webs 43, and the intermediate longitudinal supports 44, 46 are connected to the lower longitudinal supports 48, 49 by way of webs 45.

A reinforcement panel 50 from metal which is disposed on an axial end of the fiber-plastics composite body 22 is embedded between the U-shaped fiber-plastics composite body 22 and the rib structure 30. The reinforcement panel 50 reinforces the fiber-plastics composite body 22, and connects the profiled element 20 to an adjacent motor vehicle body. The reinforcement panel 50 in a form-fitting manner and by way of an adhesive connection is connected to the fiber-plastics composite body 22 and to the rib structure 30. The adhesive connection is established by way of an adhesion promoter which is applied to the surface of the reinforcement panel. The form-fitting connection is established by way of holes 52 which are configured in the reinforcement panel 50. When the rib structure 30 is being injected, the viscous fiber-plastics composite flows through the holes 52 and in the solidified state, apart from the materially integral connection between the fiber-plastics composite body 22 and the rib structure 30, forms a form-fitting connection between the reinforcement panel 50 and the fiber-plastics composite body 22, or the rib structure 30, respectively.

The fiber-plastics composite body 22 for connecting the profiled element to the adjacent motor vehicle body has inserts 261, 262, 263, 264, 265, each having an internal thread, wherein the inserts 261, 262, 263, 264, 265 are embedded in the rib structure 30 and serve as screw-fitting points.

Constructive embodiments other than the embodiments described and which are within the scope of the main claim are also possible. For example, the profiled element, the rib structure 30, or the structures of the fiber-plastics composites can be embodied in a different manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An integral component of a vehicle body, comprising:
an open profiled element; and
a reinforcing rib structure disposed in an interior of the open profiled element,
wherein the open profiled element has a fiber-plastics composite body having a first structure, and at least one reinforcement panel from metal for localized reinforcement of the profiled element, and
wherein the reinforcing rib structure is produced from a fiber-plastics composite having a second structure.

2. The integral component of the vehicle body as claimed in claim 1, wherein the fiber-plastics composite body includes a first structure comprising a thermoplastic matrix and endless fibers embedded in the thermoplastic matrix.

3. The integral component of the vehicle body as claimed in claim 2, wherein the fiber-plastics composite includes a second structure comprising a second thermoplastic matrix and short and/or long fibers embedded in the second thermoplastic matrix.

4. The integral component of the vehicle body as claimed in claim 1, wherein an encircling peripheral region of the fiber-plastics composite body is bordered by the fiber-plastics composite having the second structure.

5. The integral component of the vehicle body as claimed in claim 2, wherein the endless fibers that are embedded in the thermoplastic matrix are carbon fibers, glass fibers, basalt fibers, and/or aramid fibers.

6. The integral component of the vehicle body as claimed in claim 2, wherein the endless fibers are embedded as a woven fabric and/or as a cross-laid structure in the thermoplastic matrix.

7. The integral component of the vehicle body as claimed in claim 1, wherein the open profiled element and the reinforcing rib structure are interconnected in a materially integral manner.

8. The integral component of the vehicle body as claimed in claim 1, wherein the reinforcement panel is disposed between the fiber-plastics composite body and the reinforcing rib structure.

9. The integral component of the vehicle body as claimed in claim 1, wherein the reinforcement panel has a form-fitting connection to the fiber-plastics composite body and/or to the reinforcing rib structure.

10. The integral component of the vehicle body as claimed in claim 1, wherein the reinforcement panel adheres to the fiber-plastics composite body and/or to the reinforcing rib structure by way of an adhesion promoter.

11. The integral component of the vehicle body as claimed in claim 1, wherein the reinforcement panel is connectable to a metallic vehicle element that is adjacent to the open profiled element.

12. The integral component of the vehicle body as claimed in claim 1, wherein the reinforcement panel is produced from aluminum, steel, or stainless steel.

13. The integral component of the vehicle body as claimed in claim 1, wherein metallic inserts are fixedly integrated in the open profiled element and/or in the reinforcing rib structure.

14. The integral component of the vehicle body as claimed in claim 1, wherein the integral component is a transmission tunnel of the vehicle body.

* * * * *